United States Patent
Goo

(12) 
(10) Patent No.: US 9,672,274 B1
(45) Date of Patent: Jun. 6, 2017

(54) SCALABLE MESSAGE AGGREGATION

(75) Inventor: Almann T. Goo, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 603 days.

(21) Appl. No.: 13/535,732

(22) Filed: Jun. 28, 2012

(51) Int. Cl.
*G06F 17/00* (2006.01)
*G06F 17/30* (2006.01)

(52) U.S. Cl.
CPC .............. *G06F 17/30628* (2013.01)

(58) Field of Classification Search
CPC .............................. G06F 17/30628
USPC ...................................... 707/615
See application file for complete search history.

(56) References Cited

U.S. PATENT DOCUMENTS

| | | | |
|---|---|---|---|
| 5,960,178 A * | 9/1999 | Cochinwala | H04M 3/533 370/412 |
| 6,826,564 B2 | 11/2004 | Thompson et al. | |
| 6,862,595 B1 | 3/2005 | Elko et al. | |
| 7,716,180 B2 * | 5/2010 | Vermeulen et al. | 707/626 |
| 8,176,200 B2 | 5/2012 | Chkodrov et al. | |
| 8,626,781 B2 * | 1/2014 | Risvik et al. | 707/758 |
| 2004/0059744 A1 * | 3/2004 | Duncan | G06F 19/322 |
| 2007/0083569 A1 | 4/2007 | Wong et al. | |
| 2008/0082628 A1 | 4/2008 | Rowstron et al. | |
| 2009/0013041 A1 | 1/2009 | Farmer et al. | |
| 2009/0125701 A1 * | 5/2009 | Suponau et al. | 711/216 |
| 2010/0058013 A1 * | 3/2010 | Gelson et al. | 711/162 |
| 2010/0082816 A1 | 4/2010 | Kharat et al. | |
| 2010/0083283 A1 | 4/2010 | Kharat et al. | |
| 2010/0287171 A1 * | 11/2010 | Schneider | 707/759 |
| 2010/0287564 A1 * | 11/2010 | Willoughby | G06F 9/546 719/314 |
| 2011/0055559 A1 * | 3/2011 | Li | G06F 21/6218 713/165 |
| 2011/0099233 A1 * | 4/2011 | Calder et al. | 709/206 |
| 2013/0036427 A1 * | 2/2013 | Chen et al. | 719/312 |
| 2013/0110767 A1 * | 5/2013 | Tatemura | G06F 17/30315 707/607 |

OTHER PUBLICATIONS

Cattell, Rick, "Scalable SQL and NoSQL Data Stores", SIGMOD Record, vol. 39, No. 4, Dec. 2010, pp. 12-27.*
Debnath, Biplob, et al., "FlashStore: High Throughput Persistent Key-Value Store", Proc. of the VLDB Endowment, vol. 3, Issues 1-2, Sep. 2010, pp. 1414-1425.*
DeCandia, Giuseppe, et al., "Dynamo: Amazon's Highly Available Key-value Store", SOSP '07, Stevenson, WA, Oct. 14-17, 2007, pp. 205-220.*
Dewan, Hrishikesh, et al., "A Survey of Cloud Storage Facilities", SERVICES 2011, Washington, DC, Jul. 4-9, 2011, pp. 224-231.*

(Continued)

*Primary Examiner* — Robert Stevens
(74) *Attorney, Agent, or Firm* — Robert C. Kowert; Meyertons, Hood, Kivlin, Kowert & Goetzel, P.C.

(57) ABSTRACT

Methods and systems for scalable message aggregation are described. A method may include receiving data to store in a message queue implemented on a partitioned distributed data store. The method may also include storing the data in one or more partitions of the message queue. The method may further include aggregating the stored data into a batch.

26 Claims, 4 Drawing Sheets

(56) References Cited

OTHER PUBLICATIONS

"Message queue", Wikipedia, downloaded from: en.wikipedia.org/wiki/ Message_queue on Nov. 6, 2014, pp. 1-6.*

"Amazon Simple Queue Service", Wikipedia, downloaded from: en.wikipedia.org/wiki/Amazon_Simple_Queue_Service on Nov. 6, 2014, pp. 1-3.*

Jiang, Wenbin, et al., "Chapter 19: VESS: An Unstructured Data-Oriented Storage System for Multi-Disciplined Virtual Experiment Platform", Proc. of the International Conf. on Human-centric Computing 2011 and Embedded and Multimedia Computing 2011, LNEE vol. 102, Jul. 20, 2011, pp. 187-198.*

Karevoll, Njål, "Managing Index Repartitioning", Master of Science in Computer Science Thesis, Norwegian University of Science and Technology, Mar. 29, 2011, 104 pages.*

Pugh, Rasmus, "Cuckoo Hashing for Undergraduates", IT University of Copenhagen, Mar. 27, 2006, pp. 1-6.*

Singh, Mahima, et al., "Choosing Best Hashing Strategies and Hash Functions", IACC 2009, Patiala, India, © 2009, pp. 50-55.*

Tudorica, Bogdan George, et al., "A comparison between several NoSQL databases with comments and notes", RoEduNet 2011, Iasi, Romania, Jun. 23-25, 2011, pp. 1-5.*

Vogels, Werner, "Eventually Consistent ", Communications of the ACM, vol. 52, No. 1, Jan. 2009, pp. 40-44.*

Zhang, Zhe, et al., "A cloud queuing service with strong consistency and high availability", IBM J. Res. & Dev., vol. 55, No. 6, Paper 10, Nov./Dec. 2011, 12 pages.*

Microsoft Computer Dictionary, 5th Edition, Microsoft Press, Redmond, WA, © 2002, p. 335.*

"Amazon DynamoDB", Wikipedia, downloaded from: en.wikipedia.org/wiki/Amazon_DynamoDB on Nov. 6, 2014, pp. 1-2.*

Microsoft Computer Dictionary, 5th Edition, Microsoft Press, Redmond, WA, © 2002 Microsoft Corp., pp. 145, 335 and 433.*

Brantner, Matthias, et al., "Building a Database on S3", SIGMOD '08, Vancouver, BC, Canada, Jun. 9-12, 2008, pp. 251-263.*

Garfinkel, Simson L., "An Evaluation of Amazon's Grid Computing Services: EC2, S3 and SQS", Technical Report TR-08-07, Computer Science Group, Harvard University, Cambridge, MA, © 2007, 16 pages.*

Karve, Rutvik, et al., "Optimizing Cloud MapReduce for Processing Stream Data using Pipelining", EMS 2011, Madrid, Spain, Nov. 16-18, 2011, pp. 344-349.*

Wikipedia, "NoSQL," Jun. 28, 2012, downloaded from http://en.wikipedia.org/wiki/NoSQL, 10 pages.

* cited by examiner

SCALABLE MESSAGE AGGREGATION

BACKGROUND

Online and other remote data storage services have become widely available in recent years. In a typical model, a storage service may provide storage for backup data, which may be retrieved in the event of a hardware failure, an accidental deletion of data, or data loss as a result of a security breach or other malicious act. Storage services may also provide long-term remote storage for archival or historical purposes.

Other storage services are more short term. One example type of short term storage service is a message queue. Message queues are used to pass messages (e.g., communications) asynchronously between various components of a system or systems. Message queues, however, typically exhibit high latency and cannot deal with high throughput streams.

Figure 1:
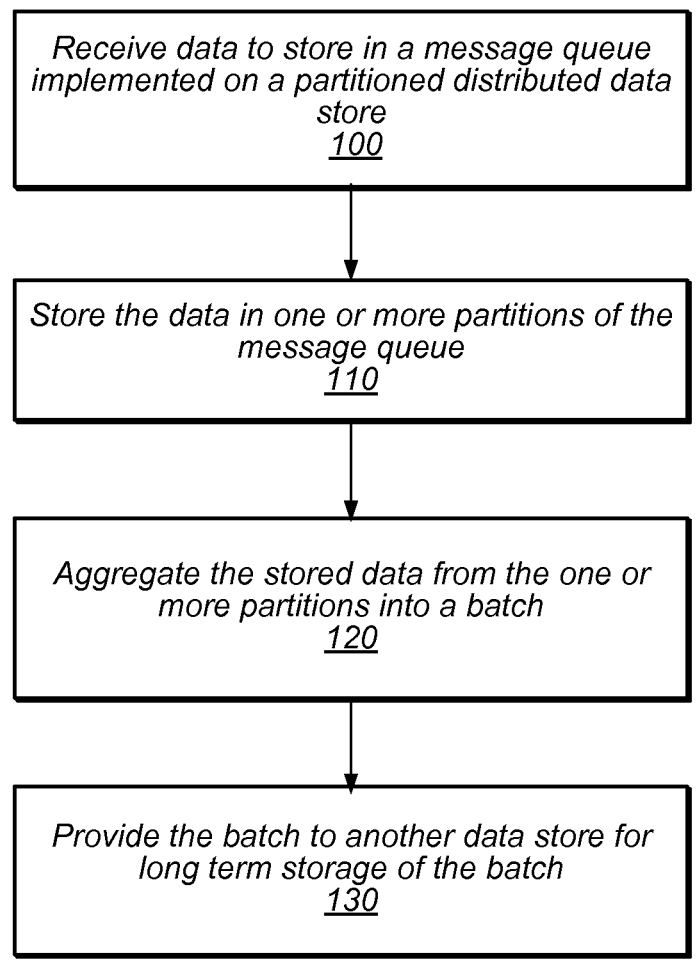
FIG. 1 is a flow diagram of scalable message aggregation, according to some embodiments.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present invention as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"First," "Second," etc. As used herein, these terms are used as labels for nouns that they precede, and do not imply any type of ordering (e.g., spatial, temporal, logical, etc.). For example, for a system configured to perform scalable message aggregation, the terms "first" and "second" messaging substrates can be used to refer to any two messaging substrates. In other words, the "first" and "second" substrates are not limited to logical substrates 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of systems and methods for scalable message aggregation are disclosed. Various ones of the present embodiments may include receiving data to store in a message queue implemented on a partitioned distributed data store (e.g., a key-value store). Various embodiments may also include storing the data in one or more partitions of the message queue. The partitions may correspond to at least one data store table. In one embodiment, the data in each partition may be ordered by key. In some embodiments, the stored data may be aggregated into a batch, which, in various embodiments, may be provided to another data store for long term storage of the batch.

The specification first describes a flowchart of one embodiment of a method for scalable message aggregation. The specification then describes an example system that may implement the disclosed scalable message aggregation techniques, followed by example partitioning in a data store table. Various examples are provided throughout the specification.

Turning now to FIG. 1, one embodiment of a method for scalable message aggregation is depicted. While the blocks are shown in a particular order for ease of understanding, other orders may be used. In some embodiments, the method of FIG. 1 may include additional (or fewer) blocks than shown. Blocks 100-130 may be performed automatically or may receive user input.

At 100, data may be received. The received data may also be referred to as an update message and/or a dataset. A dataset may refer to a single item of data (e.g., a single bit of data) or it may refer to multiple separately storable items of data, such as multiple blocks of data (e.g., 64 KB, 256 KB, 1 MB, etc.). A dataset may correspond to a logical collection of records, which may be stored in one or more partitions, as described herein. Examples of data/records may include price changes for items for sale, inventory for items for sale, catalog information, customer cart information, etc. The data may be storable in a message queue implemented on a partitioned (e.g., hash-partitioned) distributed data store. The data store may have a sortedness that allows the data in each partition to be ordered by key as opposed to random order. The message queue may be durable in that the underlying data store is durable. In some embodiments, such a data store may be a key-value store, such as a NoSQL database service (e.g., DynamoDB offered by Amazon Web Services), or some other data store. In one embodiment, the data store may include multiple stores, such as a combination of DynamoDB and some other data store such that partitions may map across the multiple stores. In such an example, the multiple different substrates may collectively be referred to as a data store, or they may be referred to as multiple data stores.

The data store may be a hosted storage platform and, in some embodiments, may provide a variety of platform services including storage, pre-computation/data derivation, and/or cache. The data store may provide for scalable, tier-1 NoSQL storage of messages. Data may persist in Berkeley databases (BDBs) for durability, 3-way replicated for redundancy, and archived in an offline system for disaster recovery. The data store may support eventual consistency and strong consistency through quorum APIs and conditional writes.

The partitioned distributed data store may be iterable by partition. This may allow data, or keys corresponding to the data, to be efficiently queried to satisfy a batch read, as described herein. Each partition may be iterable independently allowing each partition to be paged through independently. As a result, concurrency of throughput for both reads and writes is allowed.

As illustrated at 110, the received data may be stored in one or more partitions of the message queue. For a given dataset, this may include provisioning a hosted landing zone. The landing zone may include a messaging substrate that includes the partitions and a number of writer threads and a number of reader threads. As described herein, the datasets from which data is aggregated from may be managed by the hosted landing zone. As noted above, each dataset may be configured to have its own set of logical partitions, to which data can be written and from which data may be read/aggregated. As noted above, the stored data may be ordered by key within a given partition. In various embodiments, logical partitions may reside on the same substrate (e.g., Dynamo DB, etc.) or they may reside on different substrates (e.g., Dynamo DB and some other substrate, etc.).

A dataset configured within the hosted landing zone may be configured with a number of partitions that correspond to a set of data store tables and/or partition keys (e.g., hash key, entity key, etc.). In some embodiments, the data may be dynamically partitioned such that the number of partitions may be modified (e.g., added or removed). Such dynamic partitioning may be based on metadata (e.g., live metadata) associated with the data received at block 100 or based on a configuration. For example, when the dataset is constructed, the partitions may be configured/provisioned. The metadata may be managed by a metadata service. Dynamic partitioning may include generating additional partitions for storing the received data. Dynamic partitioning may also include removing partitions, as described in further detail at block 130. The number of partitions per data store table may be based on the throughput of the partitioned distributed data store and/or the desired reader concurrency, as described herein. Accordingly, in one embodiment, before performing the dynamic partitioning, a partition requirement for the data may be determined based on metadata associated with the received data and/or throughput of the partitioned distributed data store and/or the desired reader concurrency. Dynamic partitioning may allow a system that gets overloaded or backlogged to shunt new traffic to a new partition (e.g., a new set of b-trees) to keep latency down. As a result, data can be read from multiple partitions concurrently, as described herein, so as not to back up the data producer.

As noted above, the number of partitions may depend on message throughput requirements and/or latency requirements. It may also depend on the characteristics of the underlying data store. In one example data store, the default number of partitions may be 1024. If the system detects that 1024 partitions is not sufficient, then more could be added. The sufficiency of the number of partitions may be monitored and may be scaled up and down as needed. Moreover, as described herein, the system may detect underutilization of the partitions and may scale back the number of partitions. Such scaling back is described in more detail at block 130.

In one embodiment, for a given update message, a writer thread may partition, or break apart, the update into smaller blocks of data (e.g., via round-robin, hashing, random) and write the update with an ordered globally unique identifier (GUID) or GUID-like identifier, such that each block has a different, unique identifier. Because each message is written with a substantially unique key, coordination between various writer threads is not necessary when storing the update (s) into the landing zone. In some embodiments, the GUID-like identifier is based on the clock of the writer thread. The clock for a given writer thread may provide a good source of entropy, which helps lead to the uniqueness of the identifier. The GUID may be assigned to the data being stored and may be bound to the stored instance of the data for the lifetime of the stored instance.

The partitions may be bound to the underlying data store for the landing zone and not to the dataset. By modeling the partitions in this manner and with the ability to add and remove partitions, landing zone partitions may be migrated to other storage substrates seamlessly. As an example, the one or more partitions may include a first partition on a first substrate (e.g., DynamoDB) of the partitioned distributed data store and a second partition on a second substrate (e.g., data store other than DynamoDB) of the data store.

Further, the one or more partitions may reside in multiple data store tables such that storing the data includes storing the data into the multiple data store tables. Striping logical partitions for a dataset across tables may allow any single table throughput limit for the data store (if there is a limit) to be scaled past. Because of various storage substrate limitations, logical partitions in the system may contain multiple hash keys, which may be also referred to as entity keys. For example, the entity keys may be limited to 10,000 records (discriminators) and a total of 10 MB per entity. Other example limitations may exist for other substrates. Note that in the future, those example limitations may increase to other limiting values (e.g., 100,000 records and 100 MB per entity). As another example, another system may have some hash key limitation such that multiple table hash keys per logical partition may be necessary.

In various embodiments, the storing of block 120 may be performed by one or more writer threads. The writer threads may write the data into one or more of the partitions. The stored data may be stored sequentially (e.g., ordered by key) in the data store to take advantage of the sortedness of the underlying store. Accordingly, the stored data may be substantially time ordered. Substantially time ordered is used herein to mean that the data may not necessarily be stored exactly sequentially. Some situations may exist where keys may be slightly out of order (e.g., in a simultaneous write situation). One example of substantially time ordered storage may be where data is stored in the following time order: 1, 2, 4, 3, 5, 6, etc. While not in absolute time order, the times are generally increasing.

Additionally, the stored data may be associated with identifiers that are substantially/loosely monotonically increasing. Substantially monotonically increasing is used herein to mean that the identifier associated with stored data is increasing at a coarse level. At a fine level (e.g., millisecond granularity), some amount of jitter is permitted. In one embodiment, a given writer thread may write the identifier into the partitions along with the data. The identifier may be generated by the given writer thread performing the storing with a timestamp from a clock (e.g., internal to the writer thread). Some amount of randomness in the identifier may provide enough entropy such that the risk of collision is near zero, which may allow the writer threads to operate without coordinating with one another. As such, multiple writer threads may write concurrently or near concurrently to the data store. For a given concurrent writer at the exact same time stamp, the data may not come in in precise order but because the message queue is a system of transient keys and is logically moving forward, it may still hit the same page in memory. Accordingly, any impact to the underlying store is minimal.

As shown at 120, the stored data may be aggregated from the one or more partitions into a batch. In some embodiments, before performing the aggregating of block 120, readers may coordinate reading data from a given one of the partitions such that the partition is not simultaneously read. One example coordination technique may be a broadcast or other communication message being transmitted among reader threads to indicate which reader thread plans to read the partition. Another example technique of coordinating reading may be obtaining a lock for a given one of the partitions. Example locking systems may include Zookeeper, Chubby, a distributed locking service, or an application managed lock table. The locking systems may allow for course-grained read-locks (e.g., on the order of minutes) to be acquired for a given logical partition. After the lock is obtained, various items of data may be read. As described above, in one embodiment, each item of data of the stored data may be associated with a unique, ordered (e.g., time ordered) identifier. Reading the items of data may begin with the item of data having the lowest numbered identifier and proceed in a monotonically increasing manner. For example, with a given lock, a reader thread may scan the partition from the min-key until it has a sufficient number of records to archive a batch. The size of the batch may be configurable (e.g., by the reader thread, based on the underlying storage substrate, based on the data store to which the batch is transmitted, etc.).

Consider the following numerical example in which 8 pieces of data are stored in a given partition, with the 8 pieces of data being associated with identifiers 1-8, respectively. Reading of the data may begin with the piece of data having the identifier 1, and proceed sequentially in order until reaching the piece of data having the identifier 8.

In some embodiments, a reader may read data from a partition at the same time or nearly the same time a writer is writing to it. In that way, there may be no coordination between the writer thread and reader threads.

As illustrated at 130, the batch may be provided to another data store. For example, the other data store (e.g., an online storage web service, such as S3 offered by Amazon Web Services, that provides storage through web services interfaces, such as REST, SOAP, and BitTorrent™, or comparable data store) may be a data store configured to store the data long term (e.g., a durable and persistent data store). In one embodiment, a pointer to the batch or an indication of the pointer may be published. By providing the batch and publishing it in this manner, the batches may be fanned out to various consumers of the data without putting pressure on the real-time landing zone's storage substrate.

Once the batch is committed to the other data store and published, the reader thread may delete the records from the landing zone from which it committed data. If there is a partial failure, records may not be deleted and may be re-archived with a subsequent batch. Moreover, in a situation in which there is an eventual consistency, even if reader thread scans past a record that is not yet visible (e.g., in a scenario in which the partition was concurrently written to and read from), a subsequent reader thread will eventually see the previously invisible record and batch that record.

In various embodiments, a partition may be removed, or eliminated. In one embodiment, a partition may be marked as read only (e.g., in its metadata). A partition may be removed if it is marked as read only and after the read only partition has been fully read. A partition may be fully read if no records remain in the partition (e.g., eventual consistency of both the metadata and the message store). The partition may then be pruned from the partition map and it may eventually be reclaimed. Such pruning may allow for migration and flexibility of storage abstraction. Note that writer threads may not store data in a partition that has been marked as read only.

In some embodiments, data may be removed from a partition. For example, after a batch from a given partition is stored into another data store at 130 and/or an indication of a pointer to the batch is published, a reader thread may remove the stored data from that given partition.

In some embodiments the data store (e.g., which may include one or more messaging substrates) may have an entry size limit (e.g., 64 KB, 256 KB, etc.). To mitigate the limitation, the message table may support different types of records, including inline, pointer, and fragment. An inline record may provide that message content is stored inline within the table record. A pointer record may include a pointer to an external store containing the LOB of the message. The pointer may be an S3 (or comparable) pointer or a URL back to the origin service. One advantage of the pointer type is that for large records, when paired with an S3 type store, the records can be read in an atomic fashion relative to the record table. The fragment type cords may provide that message content spans multiple records in the message table. This scheme for large records may obviate the need of a separate dependency yet it may complicate retrieval in the event of eventual consistency and partial failure.

In various embodiments, the data may be encrypted. For example, the data may follow Infosec guidelines, which may call for record level encryption when the data is at a confidential or higher level. In one embodiment, as much of the encryption metadata as possible may be hosted in the metadata for the logical partition. Key rotation in such a system, depending on how much encryption metadata is in the partition metadata, may be modeled as a partition roll-off (e.g., add/deprecate/remove partitions). The system may be flexible such that if the data need not be encrypted (e.g., public information), the records may be left in plain text and not encrypted. Encryption as a partition policy metadata may allow flexibility in the event of changing security requirements.

Partition metadata may also allow for records to be compressed, for example, for inline records. Compression metadata may specify the compression algorithm (e.g., DEFLATE, LZF, etc.) as well as static dictionaries to aid in compression (e.g., ZLIB with dictionary). With the flexibility of logical partition addition/removal, the compression strategy may change as a partition roll-over without incurring a cost of storing such metadata on every record.

By supporting heterogeneous back-ends for logical partitions, the disclosed systems and techniques enable migration to other landing zone substrates and provide for flexibility in adding/removing partitions. It may also enable individual datasets to be migrated to different substrates. The ability to add/remove partitions provides control over the horizontal scaling of the landing zone. Moreover, associating a logical partition with one or more hash keys may provide flexibility to define the read lock granularity independent of limitations or partitioning of the underlying store. Additionally, the system may be able to adequately handle high throughput data streams (e.g., 1000 requests per second per table) with low latency.

A system that may implement the method of FIG. 1 may include systems that output events asynchronously. One such system is the message aggregating system shown in FIG. 2. Beginning with dataset producer 202, data (e.g., a message) may be provided by dataset producer 202 and received by landing zone (LZ) 204. In one embodiment, landing zone 204 may appear as a hosted service to dataset producer 202. An application programming interface (API) (e.g., a Representational State Transfer (REST) API) may be called by data producer 202 to transmit a PUT request to store data to landing zone 204.

Figure 2:
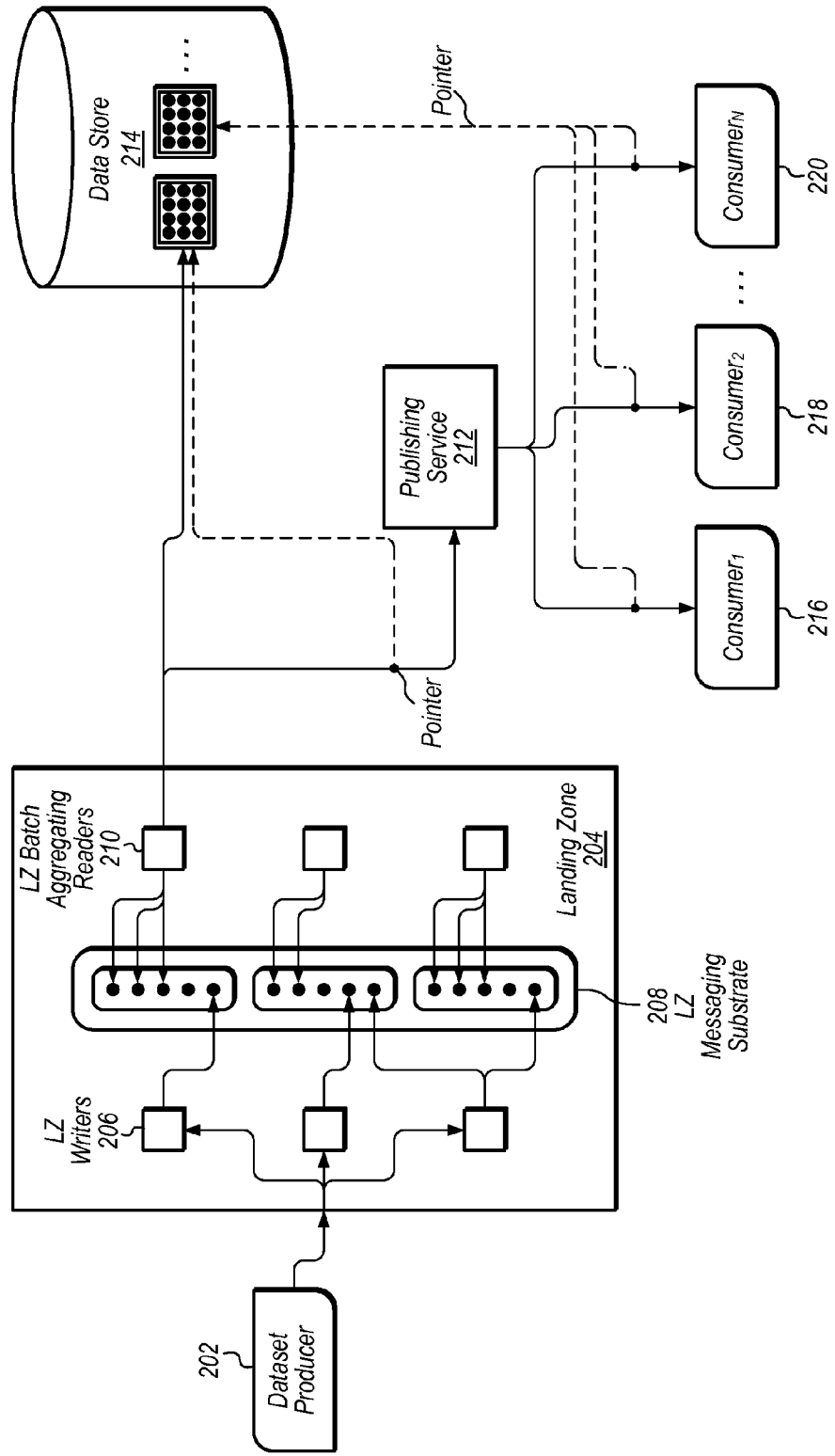
FIG. 2 is a block diagram of a system configured to perform scalable message aggregation, according to some embodiments.

After receiving the PUT request, one or more of LZ writers 206 may determine which partitions are available. For example, those partitioned may be cached, or LZ writer 206 may query LZ messaging substrate 208 to determine partition availability. Note that although FIG. 2 illustrates three LZ writers 206 and three LZ batch aggregating readers 210, in other embodiments, any number of writers and readers may exist. After determining partition availability (and after any dynamic partitioning), LZ writer 206 may select which partition to write to. A selection algorithm, such as random, round robin, etc., may be used to select the partition of LZ messaging substrate 208, which is described in greater detail in FIG. 3. Note again that although FIG. 2 illustrates a single LZ messaging substrate 208 with three partitions, in other examples, additional LZ messaging substrates and additional or fewer partitions may be present. Moreover, any one of the writers 206 and readers 210 may store and receive data, respectively, from any one of the partitions of LZ messaging substrate 208 and are not limited to a single partition as shown in FIG. 2. And as described herein, multiple writers 206 and/or readers 210 may write/read concurrently and may do some without coordination.

After selecting the partition, LZ writer 206 may then store the message in that physical partition. The message may be stored in the physical partition along with a unique identifier that is substantially monotonically increasing, as described herein. A message, or record, is illustrated in LZ messaging substrate 208 of FIG. 2 as a black dot. After the partition acknowledges that the PUT is durable, then the API can return back to dataset producer 202 to indicate that the data has been stored.

As shown in FIG. 2, LZ batch aggregating readers 210 may then read and aggregate data from one or more of the partitions of LZ messaging substrate 208. As described herein, a reader may obtain a lock on a given partition before reading data from that partition. Also as described herein, readers 210 may read data from different partitions concurrently. As a simple example with the three partitions shown in FIG. 2, the top most reader 210 may read from the top most partition at the same time the bottom most reader 210 reads data from the middle partition. Each of the top most reader 210 and bottom most reader 210 may obtain and hold a respective lock on the partition from which data is read. As shown in FIG. 2, the batched data may be provided by LZ batch aggregating readers 210 to data store 214 (e.g., S3) for durable, persistent storage of the data. Additionally, a pointer indicative of a location of the stored batch in data store 214 may be provided by the reader 210 to publishing service 212 and/or data store 214. To simplify the figure without adding clutter, FIG. 2 only shows connections from the top most reader 210 to data store 214 and publishing service 212. In some systems, each of the readers 210 may be configured to provide batch data and/or a pointer to data store 214 and publishing service 212, respectively. An indication of the pointer may be provided by the publishing service 212 to consumers 216, 218, and 220. One of the consumers, consumer 216 may be a web service interface that can be used to publish, query, and receive notifications of data availability.

Figure 3:
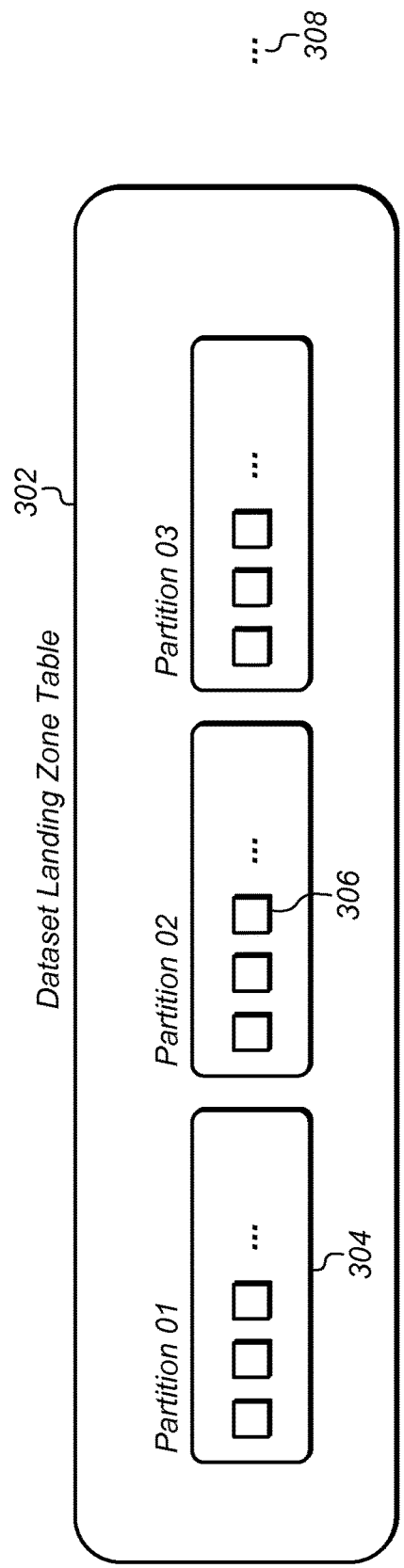
FIG. 3 is a block diagram of partitions in a landing zone substrate as part of a system configured to perform scalable message aggregation, according to some embodiments.

FIG. 3 is a more detailed block diagram of the LZ messaging substrate of FIG. 2, including various partitions configured to perform scalable message aggregation, according to some embodiments. As shown, dataset landing zone table 302 may include three partitions. As described herein, though, the number of logical partitions may vary based on a number of factors and may be dynamically changed. For example, the number of logical partitions per table may be metadata driven. This may be configured at a level to optimize throughput of the storage system and the amount of reader concurrency. Item 304 illustrates a reader thread acquiring a read lock from a lock manager for partition 01. The lock may be for a course amount of time (e.g., seconds, minutes, etc.) to aggregate data/records that have been stored in partition 01. Item 306 illustrates a writer thread storing data in partition 02. The writer thread may not need to lock the partition to write to it nor coordinate with any other threads. In one embodiment, a default case key may be a tuple of the partition ID (e.g., partition 02) and a time-oriented GUID. Item 308 represents another dataset LZ table. Mapping logical partitions over multiple tables may be performed as needed to scale past single table throughput limitations. Such mapping may be managed via metadata and may include adding logical partitions for a dataset.

Figure 4:
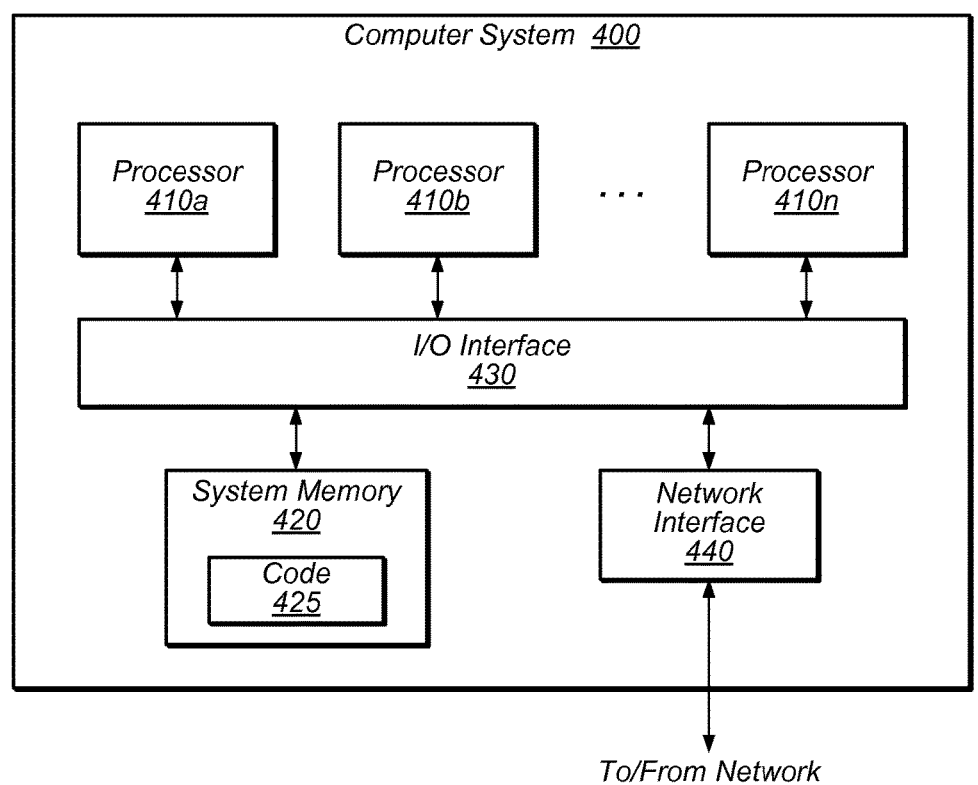
FIG. 4 is a block diagram illustrating a computer system configured to implement scalable message aggregation, according to some embodiments.

An embodiment of a computer system including computer-accessible media is illustrated in FIG. 4. As illustrated, computer system 400 includes one or more processors 410 coupled to a system memory 420 via an input/output (I/O) interface 430. Computer system 400 further includes a network interface 440 coupled to I/O interface 430. In some embodiments, landing zone 208 may be implemented using a single instance of computer system 400, while in other embodiments multiple such systems may be configured to host different portions or instances of a landing zone. Moreover, in some embodiments, some data sources or services (e.g., LZ writers) may be implemented via instances of computer system 400 that are distinct from those instances implementing other data sources or services (e.g., LZ batch aggregating readers).

In various embodiments computer system 400 may be a single processor system including one processor 410, or a multiprocessor system including several processors 410 (e.g., two, four, eight, or another suitable number). Processors 410 may be any suitable processor capable of executing instructions. For example, in various embodiments, processors 410 may be a general-purpose or embedded processor implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store instructions and data accessible by process 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 420 as code 425.

In one embodiment, I/O interface 430 may be configured to coordinate I/O traffic between processor 410, system memory 420, and any peripheral devices in the device, including network interface 440 or other peripheral interfaces. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network, such as other computer systems, for example. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Embodiments may be provided as a computer program product including a non-transitory machine-readable storage medium having stored thereon instructions (in compressed or uncompressed form) that may be used to program a computer (or other electronic device) to perform processes or methods described herein. System memory 420 may be one embodiment of a computer-accessible/machine-readable storage medium configured to store program instructions and data as described above. However, in other embodiments, program instructions and/or data may be received, sent or stored upon different types of computer-accessible media. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system, comprising:
a memory; and
one or more processors coupled to the memory, wherein the memory comprises program instructions executable by the one or more processors to cause the one or more processors to:
receive data to store in a message queue implemented on a partitioned distributed key-value data store;
store the received data in one or more partitions of the message queue, wherein the one or more partitions correspond to at least one data store table, wherein data in each partition is ordered by a key;
determine whether a number of records in the stored data satisfies a size threshold:
in response to a determination that the number of records satisfies the size threshold, aggregate the stored data in the one or more partitions into a batch of data;
send the batch to another data store configured to store the batch long term, wherein the other data store is distinct from the distributed key-value data store; and
provide a pointer to the batch stored at the other data store to an entity such that the stored data in the batch is accessible at the other data store using the pointer to the batch.

2. The system of claim 1, wherein the program instructions are further executable by the one or more processors to cause the one or more processors to:

dynamically partition the partitioned distributed key-value data store based on the metadata corresponding to the received data, wherein the partitioned distributed key-value data store is dynamically partitioned by modifying a number of partitions of the message queue, and wherein the data is stored in the modified number of partitions.

3. The system of claim 1, wherein the program instructions are further executable by the one or more processors to cause the one or more processors to:
prior to aggregating the stored data, coordinate reading of a given one of the one or more partitions;
wherein the stored data is aggregated by aggregating the stored data from the one partition, wherein each item of data of the stored data from the one partition is associated with a unique, ordered identifier, wherein the stored data is aggregated beginning with the item of data associated with a lowest numbered identifier.

4. A method, comprising:
performing, by one or more computers:
receiving data to store in a message queue implemented on a partitioned distributed key-value data store;
storing the received data in one or more partitions of the message queue, wherein the one or more partitions correspond to one or more data store tables;
determining whether a number of records in the stored data satisfies a size threshold:
in response to a determination that the number of records satisfies the size threshold, aggregating the stored data in the one or more partitions into a batch of data;
sending the batch to another data store configured to store the batch, wherein the other data store is distinct from the distributed key-value data store; and
providing a pointer to the batch stored at the other data store to an entity such that the stored data in the batch is accessible at the other data store using the pointer to the batch.

5. The method of claim 4, further comprising dynamically partitioning the partitioned distributed key-value data store based on metadata, wherein said dynamically partitioning includes generating additional partitions for storing the received data.

6. The method of claim 4, wherein a number of the one or more partitions per data store table of the partitioned distributed key-value data store is based on a throughput of the partitioned distributed key-value data store.

7. The method of claim 4, wherein a number of the one or more partitions per data store table of the partitioned distributed key-value data store is based on an amount of concurrency of a plurality of reader threads performing said aggregating.

8. The method of claim 4, wherein said storing includes storing the received data into multiple data store tables.

9. The method of claim 4, wherein the data is stored in a substantially time ordered manner.

10. The method of claim 4, further comprising:
prior to said storing, partitioning, via a writer thread, the data into the one or more partitions, wherein said storing includes writing the partitioned data with an identifier indicative of a time order, wherein the data in each partition is ordered by key.

11. The method of claim 4, wherein said storing is performed by a writer thread, wherein the writer thread performs said storing without coordinating with other writer threads.

12. The method of claim 4, wherein said determining and said aggregating are performed by a reader thread, the method further comprising coordinating with other reader threads prior to the reader thread performing said aggregating the stored data from one of the one or more partitions.

13. The method of claim 12, wherein said coordinating with other reader threads includes obtaining a lock for the one of the one or more partitions, and wherein the size threshold is configurable by the reader thread.

14. The method of claim 4, further comprising eliminating a partition that is marked as read only after the read only partition has been fully read, wherein the read only partition has been fully read based on a determination that no records remain in the read only partion.

15. The method of claim 4, wherein the partitioned distributed key-value data store is iterable by partition.

16. The method of claim 4, further comprising:
in response to the batch being stored at the other data store and an indication of the pointer to the batch is published by the entity, a reader thread removing the stored data from the one or more partitions stored on the partitioned distributed key-value data store.

17. The method of claim 4, wherein the one or more partitions includes a first partition on a first substrate of the partitioned distributed key-value data store and a second partition on a second substrate of the partitioned distributed key-value data store.

18. The method of claim 4, wherein the partitioned distributed key-value data store is a hash-partitioned store.

19. A non-transitory computer-readable storage medium storing program instructions, wherein the program instructions are computer-executable to implement:
receiving data to store in a message queue implemented on a partitioned distributed key-value data store;
storing the received data in one or more partitions of the message queue, wherein the one or more partitions correspond to at least one data store table;
determining whether a number of records in the stored data satisfies a size threshold:
in response to a determination that the number of records satisfies the size threshold, aggregating the stored data in the one or more partitions into a batch of data;
sending the batch to another data store configured to store the batch, wherein the other data store is distinct from the distributed key-value data store; and
providing a pointer to the batch stored at the other data store to an entity such that the stored data in the batch is accessible at the other data store using the pointer to the batch.

20. The non-transitory computer-readable storage medium of claim 19, wherein said aggregating includes a reader thread obtaining a lock on one of the one or more partitions, and reading stored data from the one partition.

21. The non-transitory computer-readable storage medium of claim 20, wherein the stored data from the one partition includes a plurality of items of data with each item of data being stored with an associated substantially monotonically increasing identifier, wherein said reading the stored data begins with the stored item of data having a lowest valued identifier associated with it.

22. The non-transitory computer-readable storage medium of claim 19, wherein a size of the batch is configurable based on the other data store to which the batch is sent, and wherein the size threshold is based on the configured size of the batch.

23. The non-transitory computer-readable storage medium of claim 19, wherein the program instructions are further computer-executable to implement:

partitioning the partitioned distributed key-value data store based on the metadata corresponding to the received data, wherein partitioning includes modifying a number of partitions of the message queue.

24. A method, comprising:

performing, by one or more computers:

receiving data to store in a message queue implemented on a partitioned distributed data store;

determining a partition requirement for the received data based on metadata corresponding to the received data;

storing the received data in one or more partitions of the message queue;

determining whether a number of records in the stored data satisfies a size threshold; and in response to a determination that the number of records satisfies the size threshold, aggregating the stored data in the one or more partitions into a batch of data.

25. The method of claim 24, wherein said determining includes determining that additional partitions should be generated, wherein the one or more partitions into which the data is stored includes the additional partitions.

26. The method of claim 24, further comprising:

before performing said aggregating, obtaining a lock for a given one of the one or more partitions;

wherein said aggregating includes aggregating the stored data from the one partition, wherein each item of data of the stored data from the one partition is associated with a unique, substantially time-ordered identifier, wherein said aggregating the stored data from the one partition begins with the item of data associated with the earliest substantially time-ordered identifier.

\* \* \* \* \*